United States Patent
Bowers et al.

(10) Patent No.: US 7,482,929 B2
(45) Date of Patent: Jan. 27, 2009

(54) POINT-OF-SALE ACTIVATION OF CONSUMER ELECTRONICS

(75) Inventors: Richard G. Bowers, Rogers, AR (US); Stefan G. Hild, Somers, NY (US); Paul D. Lindsey, Springdale, AR (US); Paul A. Moskowitz, Yorktown Heights, NY (US); Eric J. Nilsen, Rogers, AR (US)

(73) Assignee: International Business Machines Corporation, Armonk, NY (US)

(*) Notice: Subject to any disclaimer, the term of this patent is extended or adjusted under 35 U.S.C. 154(b) by 174 days.

(21) Appl. No.: 11/415,055

(22) Filed: May 1, 2006

(65) Prior Publication Data

US 2007/0257768 A1  Nov. 8, 2007

(51) Int. Cl.
  *G08B 13/14* (2006.01)
  *G05B 19/00* (2006.01)
(52) U.S. Cl. ............... 340/572.1; 340/572.2; 340/5.92; 340/10.1; 340/10.51; 340/572.9; 235/375; 235/386; 235/435
(58) Field of Classification Search .............. 340/572.1, 340/5.92, 521, 572.2, 572.8, 572.9, 825.72, 340/825.26, 825.28, 5.61, 5.74, 10.1, 10.5, 340/10.51; 705/23, 64; 235/385, 375, 386, 235/435
See application file for complete search history.

(56) References Cited

U.S. PATENT DOCUMENTS

| | | | |
|---|---|---|---|
| 6,592,038 B2 * | 7/2003 | Goodwin, III | 235/462.46 |
| 2005/0178832 A1 * | 8/2005 | Higuchi | 235/440 |
| 2005/0273434 A1 * | 12/2005 | Lubow | 705/59 |
| 2006/0095385 A1 * | 5/2006 | Atkinson et al. | 705/64 |
| 2006/0187042 A1 * | 8/2006 | Romer et al. | 340/572.1 |
| 2006/0273910 A1 * | 12/2006 | Narlow et al. | 340/572.7 |
| 2007/0188306 A1 * | 8/2007 | Tethrake et al. | 340/10.51 |

* cited by examiner

*Primary Examiner*—Benjamin C Lee
*Assistant Examiner*—Sisay Yacob
(74) *Attorney, Agent, or Firm*—Michael J. Buchenhorner; Douglas W. Cameron

(57) ABSTRACT

A method for activating a device operatively coupled to an activation circuit includes steps of: receiving a password-protected instruction sent by wireless communication to the device; decoding the instruction using the password; and activating the activation circuit by permanently changing the state of the activation circuit from an off state to an on state.

8 Claims, 4 Drawing Sheets

Fig. 1 Activation System

Fig. 2 Architecture Embodiment

POINT-OF-SALE ACTIVATION OF CONSUMER ELECTRONICS

BACKGROUND

The present invention relates to consumer electronics and more specifically to a system for activation of an electronic component at a point of sale terminal.

Radio-frequency identification (RFID) technology is being implemented at many large retail establishments at the case and pallet level. Pilot implementation of RFID tagging for individual items has started. It is likely that widespread item-level RFID tagging will follow. A significant problem for retailers has always been inventory shrinkage due to theft or loss of items, which can exceed one percent of total sales revenue. For large retailers, this shrinkage can translate into millions, and for some billions, of dollars. High shrinkage areas within the business include the areas of electronics devices, small home appliances, and multimedia (CD, electronic games, and DVD players). These are high value, high margin products, which are easily concealed, lending to a very high internal as well as external theft rate. Many factors play into high shrinkage, such as poor inventory management, poor hiring and training choices, as well as poor operational practices at the store level. These operational issues lead to excessive product turnover rates, poor customer services with stock outages, all leading to lost sales and lower margins. Depending on the inventory agreement between the retailer and supplier, the financial impact can apply to both. In the end, it is the honest consumer that pays for the incremental cost of inventory shrinkage.

There is a need for a solution to limit the theft or shrinkage of items. RFID tagging of the item level product may help if the RFID tags are used for both checkout and as anti-theft devices. If used as anti-theft RFID tagged items would be scanned at doorways. Tags for which an anti-theft bit had not been deactivated would trigger an alarm. However, RFID as an anti-theft technology may be defeated by various means including the use of metal shielding, or the removal, destruction, or substitution of the tags. Employees may also remove items through doorways that are not equipped with anti-theft scanners or readers. Traditional electric or magnetic ant-theft tags have the same deficiencies. Thus there is a need to employ an improved anti-theft method.

SUMMARY

According to one embodiment of the invention, wireless activation technology is imbedded in an item by the supplier, and enabled by the retailer at the point of sale. This solution is applicable to products such as iPod and other MP3 devices, video game modules, electronic toys, cell phones, and portable DVD players, or any electric or electronic device.

It is the aim of this invention to provide a method for wireless activation technology, such that an electric or electronic device is activated only when a password for activation is supplied by wireless means at the point-of-sale.

It is further the aim of the invention to provide a means for generating a password that combines elements from different tagging means, e.g., RFID tags and barcodes to make decryption of the password more difficult.

It is also the aim of this invention to provide a method for the mutual authentication of labels applied to retail items.

DETAILED DESCRIPTION

As RFID becomes more popular suppliers will implement an RFID or other wireless sensor as part of their item level product. Once the items came into the store via case or pallet, the bulk items would be broken down into the item level.

Figure 1:
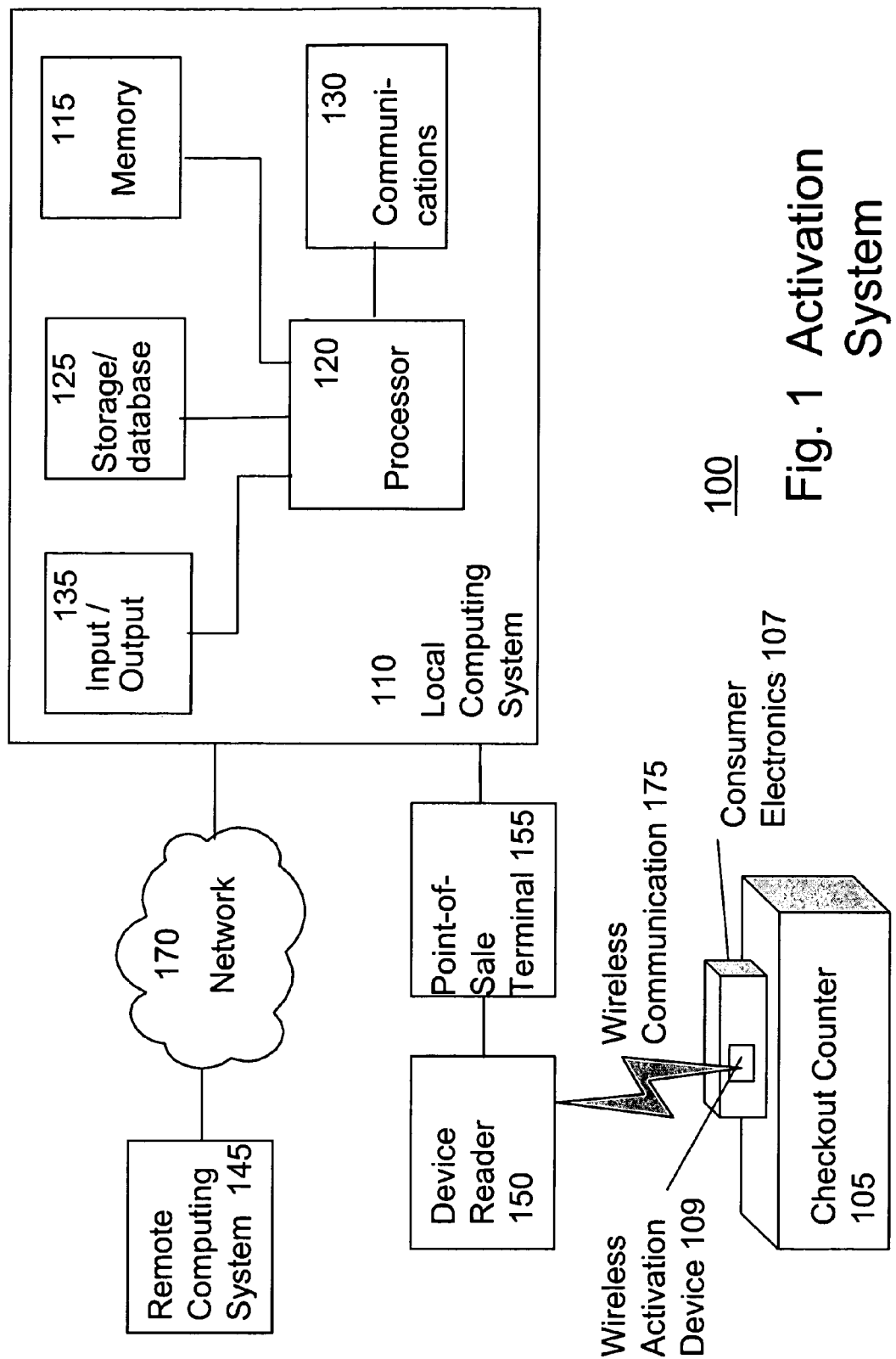
FIG. 1 is a high level block diagram of an activation system according to an embodiment of the invention.

Referring to FIG. 1, a system 100 according to an embodiment of the invention comprises a computing device or local computing system 110. The computing device 110 may be a personal computer or server such as those manufactured by IBM of Armonk, N.Y. The computing device 110 may comprise input/output systems 135 such as a display and keyboard, a storage device 125 such as a hard drive, computer memory 115, a processor 120, and communications capability 130 which permit the computing system 110 to be connected to a network 170, such as the Internet, and thus to other remote computing systems 145.

The computing system 110 is used to control a point-of-sale terminal (POS) 155, and a reader or communications device 150 for reading and communicating with a circuit containing a wireless activation device 109. The reader devices 109, or device reader, may communicate with the point-of-sale terminal 155 and computing system 110 by wired or wireless means such as WiFi, 801.11x, or Bluetooth.

The reader 150 and wireless activation device 109 may form a system that uses RFID for communications, or other wireless communications systems 175 such as Bluetooth, Zigbee, or WiFi. The electronics item 107 may be manufactured with the functioning of the power supply or other critical component such as the display screen or speakers are in a disabled state. The wireless activation device 109, e.g. RFID tag, or Bluetooth, Zigbee, WiFi communication devices, upon receipt of a password protected command may be used to initiate a switching circuit to enable an activation circuit to enable the working of the power supply or other circuit of the electronic item 107. The password-protected instruction conveyed by wireless communication 175 to the wireless activation device 109 may permanently change the state of an activation circuit from off to on. Thus, the electronics item may be enabled at a Point of Sale 155. Additionally, the point-of-sale or local computing system may be used to store and manage the passwords used to enable the activation device. The wireless activation device may be an RFID circuit which also contains product information, e.g. an EPCglobal electronic product code. The product information may be recorded at the same time that the activation is accomplished.

Retailers will be able to identify the need for a specific product on the shelf. The system makes the needed recommendations of the correct number of units to be placed on the shelf. This number is derived on sell through information gained from the stores sales processors. As each product is tracked through the register the RFID tag may be scanned or read at the point of sale and the sales data is then moved into the store's order database triggering a re-order process.

Unlike previous wireless locking and unlocking systems, in one embodiment of this system 100 the activation may be performed once and is permanent. In a preferred embodiment, shrinkage, or theft, may be reduced by the inclusion of a wireless device 109 to enable the working of a consumer electronic item 107, such as small home appliances, multimedia, CD, electronic game, electric razor, DVD players, stereo, MP3 player, computer, PDA, and TV. The electronic item 107 may be manufactured with the functioning of the power supply or other critical component such as the display screen or speakers in a disabled state. The wireless device 109, e.g. RFID tag, Bluetooth, Zigbee, WiFi, and the like, upon receipt of a pass-word protected command is used to initiate a switching circuit to enable the working of the power supply of the electronic item 107. The electronic item 107 may be enabled at the Point of Sale 155.

Figure 2:
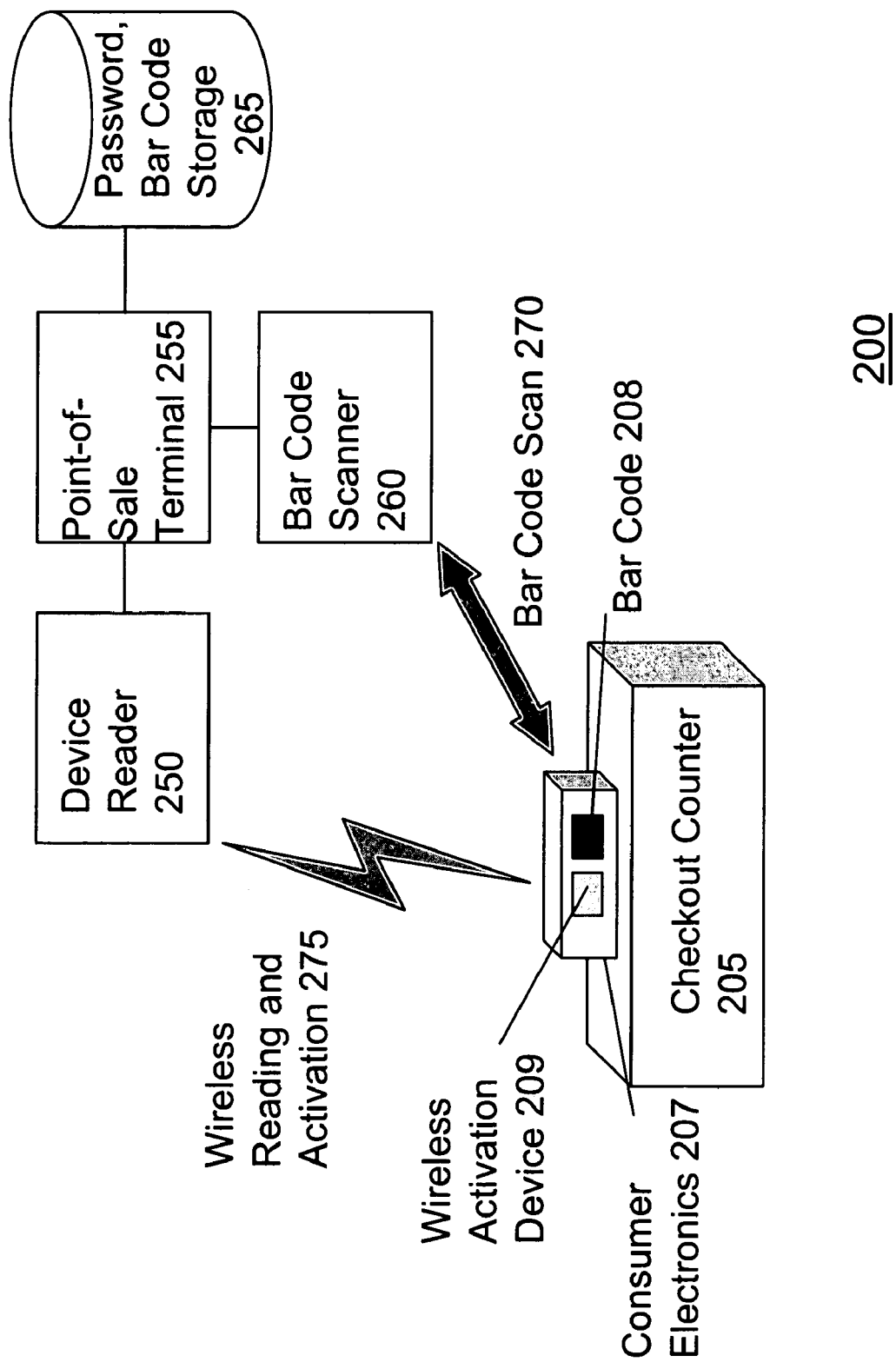
FIG. 2 is a high level block diagram of an architecture according to an embodiment of the invention.

FIG. 2 is an embodiment of an architecture 200 according to an embodiment of the invention. In this embodiment, a bar code scanner 260 scans an attached bar code 208 and a wireless activation device 209 which may be a passive RFID tag is read by a device reader 250. It is not necessary that the item be an electronic item. The readings of the two tags are used to authenticate one-another to provide security and authentication. They may then be used for the enablement of a consumer electronics item 207. In one embodiment, the password for wireless activation is stored in storage device 265. The password may be a function of the bar code digits also stored in storage device 265. The password may be a mathematical function of both an RFID product label and a bar code product label. At the point of sale 255 when the consumer electronics product 207 is placed on a checkout counter 205, a unique ID in the tag 209 is read wirelessly by a reader 250, while the bar code is scanned 270 by a scanner 260. The results are compared in the computing system associated with the point of sale. If the comparison is authenticated, a password is retrieved from storage device 265 or a new password is generated based upon both the RFID product label number which may be an Electronic Product Code (EPC) and the attached bar code number. The password is used to activate by wireless means 275 the activation device or tag 209.

Thus, the scanning operation may be used to determine the authenticity of the bar code number and the RFID tag number. These numbers may be compared in the computing system to determine whether the numbers are consistent, e.g. that at least one of the tags has not been switched with another one.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors 120 executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Figure 3:
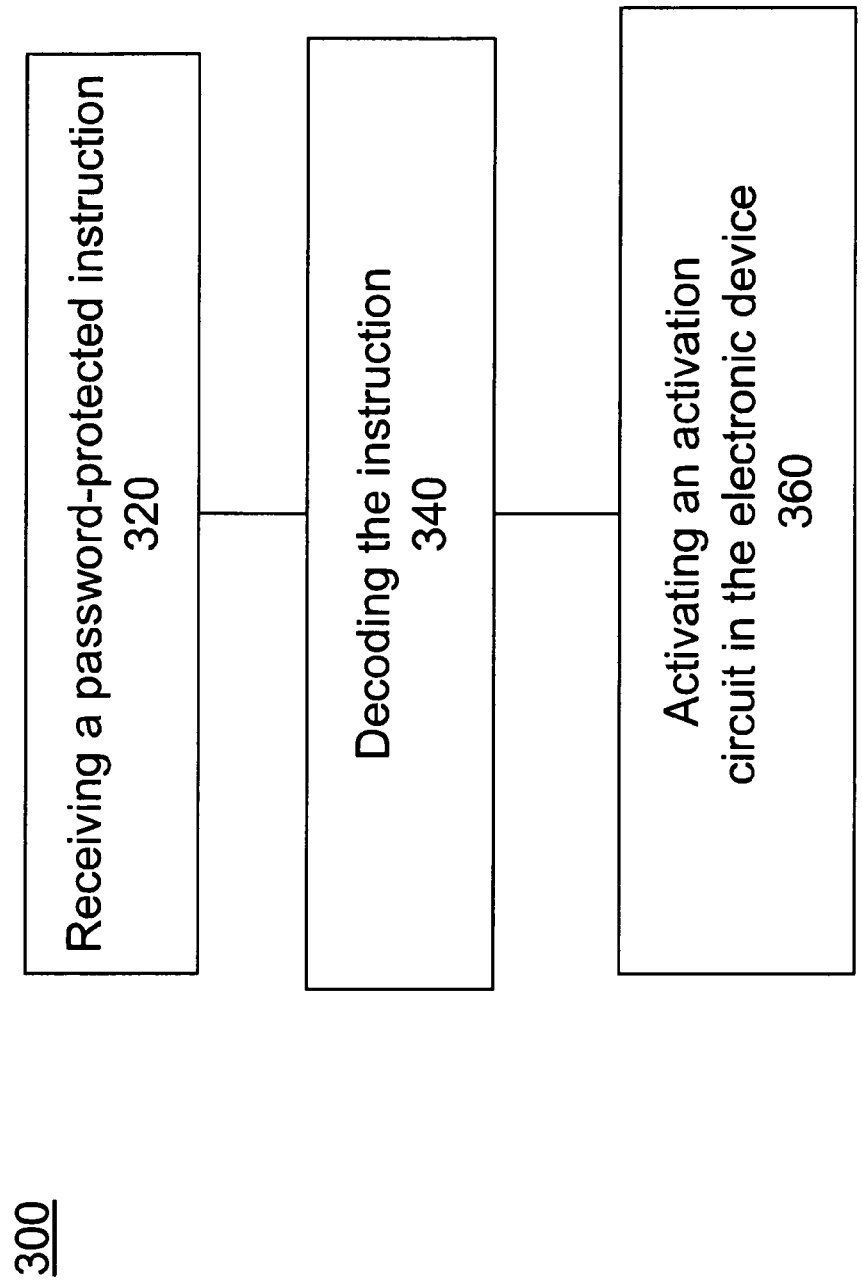
FIG. 3 is a flowchart illustrating a method according to another embodiment.

Referring to FIG. 3 a flowchart illustrates a method 300 according to another embodiment. The method comprises a step 320 of receiving a password-protected instruction by a wireless communication device embedded within an electronic device. In step 340 the system decodes the password-protected instruction. In step 360 the system activates an activation circuit in the electronic device by permanently changing the state of the activation circuit from an off state to an on state.

Figure 4:
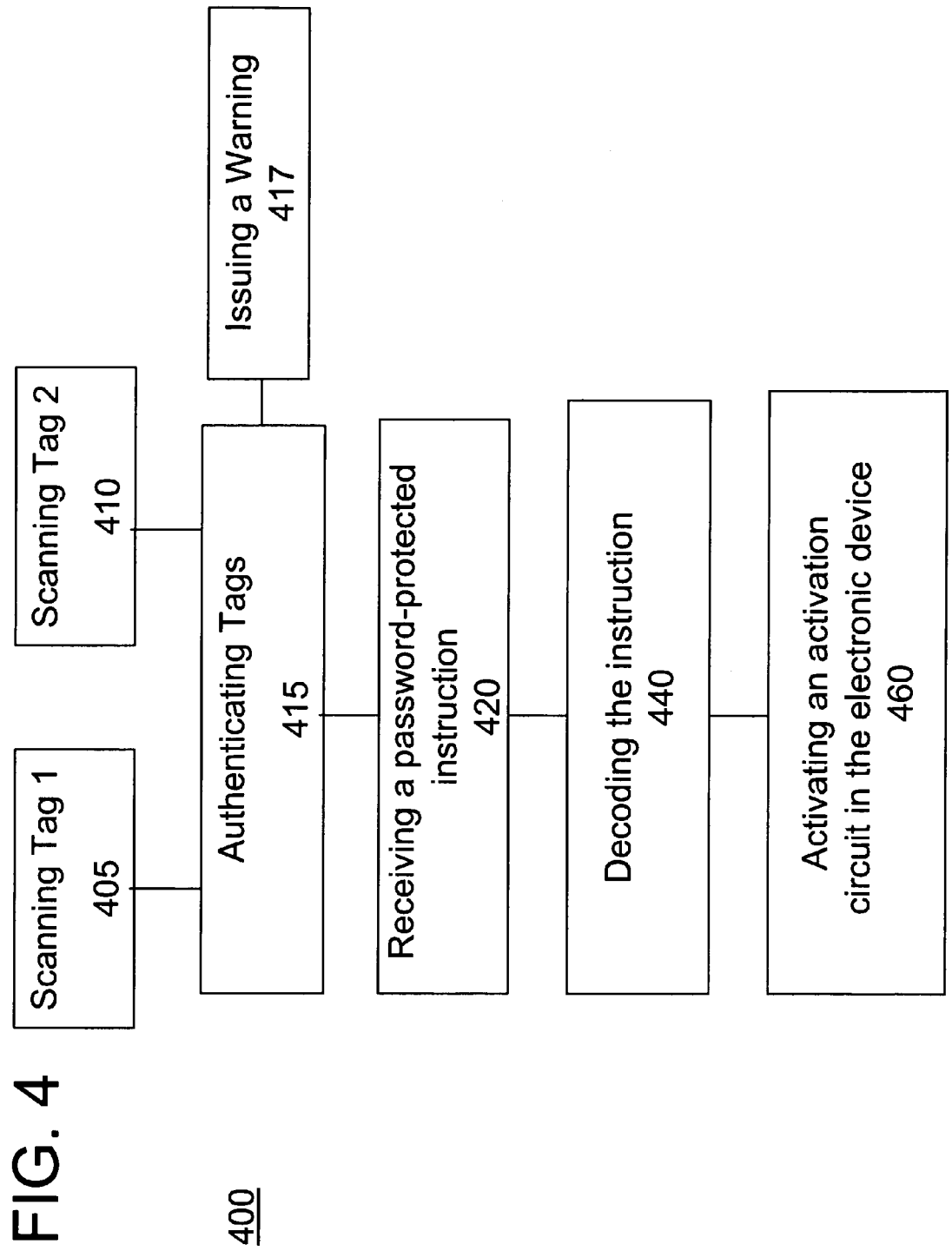
FIG. 4 is a flowchart illustrating a method according to another embodiment.

Referring to FIG. 4 a flowchart illustrates a method 400 according to another embodiment. The method comprises a step 405 in which a first tag associated with the item is scanned. The first tag may be an RFID tag which contains an identifying number such as the EPC number associated with the product. Simultaneously, or in close time proximity, another tag is scanned, step 410. This tag may be another tag of the same kind, e.g. an RFID tag, or it may be a bar code. The second tag may also contain information relating to the product. In step 415, a computing system is employed to compare the information on the tags. The tags may be compared with each other to confirm their mutual consistency. If the tags are not authentic, then an alarm may be issued, step 417. If the tags identifiers are consistent, then a password or pass code is retrieved from the computer database.

The method then comprises a step 420 of receiving a password-protected instruction by a wireless communication device embedded within an electronic device. In step 440 the system decodes the password-protected instruction. In step 460 the system activates an activation circuit in the electronic device by permanently changing the state of the activation circuit from an off state to an on state.

Processors 120 suitable for the execution of a computer program include, by way of example, both general and special purpose microprocessors, and any one or more processors of any kind of digital computer. Generally, a processor 120 will receive instructions and data from a read only memory (not shown) or a random access memory 115 or both. The essential elements of a computer are a processor 120 for executing instructions and one or more memory devices for storing instructions and data. Generally, a computer 110 will also include, or be operatively coupled to receive data from or transfer data to, or both, one or more mass storage devices 125 for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor 120 and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A method of activating a device, the method comprising:
receiving an instruction encoded with a password from a wireless communication device embedded within the device, wherein the password is a mathematical function of a first product identifier and a second product identifier attached to the device;
decoding the instruction using the password; and
activating an activation circuit in the device by permanently changing the state of the activation circuit from an off state to an on state.

2. The method of claim 1 further comprising performing the activation and sending the instruction at a point of sale terminal.

3. The method of claim 1 further comprising storing the first and second product identifiers at the same time as the electronic device is activated.

4. The method of claim 1 further comprising storing and managing activation passwords.

5. A machine-implemented method comprising:
   scanning a first tag, the first tag being an RFID product label containing first identification information associated with an item at a point-of-sale terminal;
   scanning a second tag, the second tag comprising a bar code containing second identification information associated with the item at a point-of sale terminal;
   comparing the first identification information with the second identification information;
   if the first and second identification information is consistent:
      retrieving a password from a data store, wherein the password is a mathematical function of both the RFID product label and the bar code; and
      transmitting the password to the item, with an activation command; and
   issuing a warning that at least one of the tags is not authentic when the first and second identification information is inconsistent.

6. A machine-implemented method comprising:
   scanning a first tag, the first tag being an RFID tag containing identification information associated with an item at a point-of-sale, wherein the identification information comprises a first product code;
   scanning a second tag, the second tag comprising a bar code containing identification information associated with the item at a point-of sale, wherein the identification information comprises a second product code;
   comparing the identification information contained by the first tag with the identification information contained by the second tag;
      confirming a mutual authenticity of the identification information contained by the first and second product codes; and
   sending an activation password by a wireless medium to an activation circuit contained within the item, wherein the password is a mathematical function of the first and second product codes.

7. The method of claim 6 wherein the item is an electronics product.

8. The method of claim 6 wherein sending said activation password is performed once and is permanent.

\* \* \* \* \*